May 12, 1931.  H. C. LORD  1,804,697
BRAKE AND METHOD OF ACTUATING THE SAME
Filed Jan. 26, 1925   3 Sheets-Sheet 1

Inventor

May 12, 1931.                H. C. LORD                1,804,697
                BRAKE AND METHOD OF ACTUATING THE SAME
                Filed Jan. 26, 1925        3 Sheets-Sheet 2

Patented May 12, 1931

1,804,697

UNITED STATES PATENT OFFICE

HUGH C. LORD, OF ERIE, PENNSYLVANIA

BRAKE AND METHOD OF ACTUATING THE SAME

Application filed January 26, 1925. Serial No. 4,865.

It has heretofore been attempted to equalize brakes at opposite sides of vehicles by adjusting them so that there can be an equal setting pressure delivered to the brake mechanisms. Such devices do not accomplish equal braking because of variations in the engaging qualities of the brake surfaces. The present invention is designed to equalize the braking effect by making the pull exerted between the brake drum and the brake shoe an element, or factor of the control of the brake setting mechanism. Broadly this may be accomplished in various ways. As exemplified the brake, or brake shoe, as the case may be, is supplied with a yielding anchor, the movement of the anchor being resisted by a spring. The compression of this spring represents, therefore, the pull exerted between the brake drum and the brake shoe. I then provide mechanism for setting the brake which will be released by the movement of the anchor so that a given setting position of the setting mechanism will compel a corresponding movement of the anchorage before release can take place and in consequence with a given setting of the device there is accomplished a definite braking effect regardless of the condition of the engaging surfaces of the brake members. It is, therefore, possible to give equal braking effect on the two sides of the vehicle. The apparatus is also of advantage in preventing the grabbing of the brake because on the initial engagement of the brake the anchorage is moved and a release affected. Thus the brake systems of a design undesirable without such disengaging means become entirely feasible and desirable. I prefer to provide the brake setting mechanism with fluid actuating means, preferably power-driven, or of the servo brake type and where this is done the setting mechanism involves a valve which delivers pressure to the brake system until the desired pull corresponding to the setting of the valve has been established at which time the valve through the action of the mechanism is returned to its neutral position, thus establishing a definite braking effect corresponding to the setting of the mechanism. I prefer to make the brake system responsive in control to the speed of the rotating parts subjected to the brake and preferably derive the power for this directly from the wheel, or part on which braking action is desired to the end that a locking of the wheel may be prevented through the slowing of the speed of the wheel, or part, below a certain minimum. I also prefer to provide the device with means responsive to brake pull in either direction, that is to say, with the wheel moving forward or backward. An equal movement of a plurality of brake setting mechanisms may be accomplished through a mechanical connection but preferably this is accomplished through a fluid actuating system involving a pressure responsive device at the setting mechanism and separate pressure creating devices at the point of control, the separate pressure creating devices being operated in unison to affect equal responses at the setting mechanism. Other features and details will appear from the specification and claims.

The apparatus forming the subject matter of the invention and by which the method may be practiced is illustrated in the accompanying drawings as follows:—

Figures 1, 3:
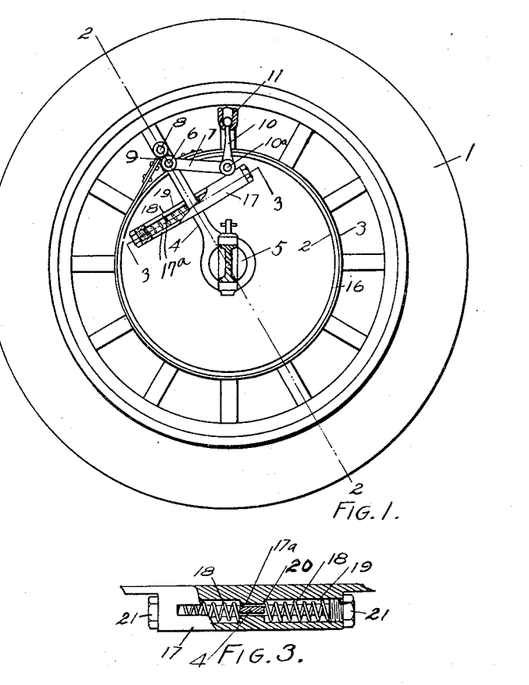
Fig. 1 shows a side elevation, partly in section, of a mechanically actuated external band brake.
Fig. 3 a section on the line 3—3 in Fig. 1.
Figure 2:
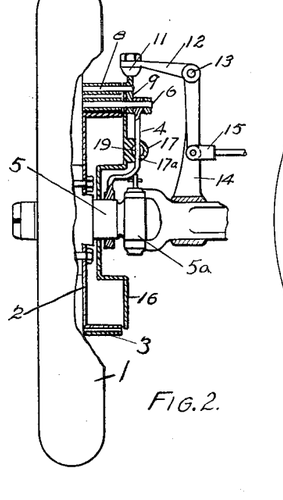
Fig. 2 a side elevation, partly in section, on the line 2—2 in Fig. 1.

1 marks the wheel, 2 the brake drum, and 3 the exterior brake band. An anchor arm 4 is swingingly mounted on an axle 5, or any bearing having an axis coincident with the axis of the wheel. One end of the brake band is secured to a pin 6 and a setting lever 7 is also journaled on the same pin and has a bell crank arm 9. The opposite end of the brake band is secured by a pin 8 to the end of the arm 9. It will be seen that with an inward movement of the lever 7 the brake band is tightened and the brake set.

The lever 7 is actuated by a radially extending link 10. This is connected by a ball joint 11 with one arm of a bell crank lever 12. The lever 12 is pivotally mounted on a pin 13 secured to a post 14 extending upwardly from the axle. The opposite end of the bell crank lever is secured to the brake rod 15. The structure is shown as applied to the front wheel of an automobile and the axis of the ball joint 11 is approximately coincident with the knuckle joint 5a of the axle.

The anchor arm 4 extends through a slot 17a in a spring housing 17, the spring housing 17 being carried by a brake band housing 16. A spring 18 is arranged in openings 19, at each end of the housing 17, the springs seating against shoulders 20 at the center, the shoulders being of a width corresponding to the width of the arm 4, the outer ends of the springs being seated against cap bolts 21 closing the openings 19. The operation of this mechanism is as follows: The operator through the brake rod 15, bell crank 12 and link 10 forces down the lever 7 setting the brake. Immediately the brake engages and is subjected to the torque pull of the brake drum. This is communicated to the anchor arm 4 and the thrust is exerted on the spring 18 in the direction the wheel is moving. The setting action of the lever 7 is sufficient to engage the brake with a greater braking effect than is ordinarily required for the immediate emergency so that there is an immediate movement of the anchorage due to this braking effect. This movement if the brake lever 7 were retained in its set position would move the pivotal connection between the lever and link 10 at 10a in an arc with the axis of the wheel as a center. It is compelled, however, to move in an arc with the center of the joint 11 as a center due to the action of the link 10. Consequently a movement of the anchorage due to the pull of the brake band immediately starts the release of the brake and the brake, therefore, is released to an extent which will balance the resistance of the spring at the point to which the anchorage 4 is moved. This point at which the parts come to balance is controlled by the depression of the ball joint 11. Therefore with a greater depression of the ball joint the release which will balance the resistance of the spring will require a greater movement of the anchor arm and this will correspond with a greater resistance of the spring and consequently there will be a greater braking action. The setting engagement of the brake shoes and mechanism applying the braking pressure are so arranged as to have an excess of braking action over what would be required if the brake were not supplied with a releasing mechanism. This excess should be such that with each setting of the brake mechanism there will be a sufficient pull incident to the braking engagement of the brake surfaces regardless of the efficiency of those surfaces to cause a forward movement of the engaged parts sufficient to affect the releasing action so that with a given setting of the brake mechanism, that is to say, a definite positioning of the ball joint a given braking pull within a close approximation will be affected regardless of the condition of the brake surfaces, the braking mechanism setting the surfaces to affect an excess of braking action and the releasing mechanism taking out so much of the excess as is necessary to give a definite pull for a definite setting of the brake mechanism.

It will be noted that the link 10 will swing in either direction and will release the lever 7 as swung in either direction so that the brake will operate with a movement of the wheel in either direction.

Figure 4:
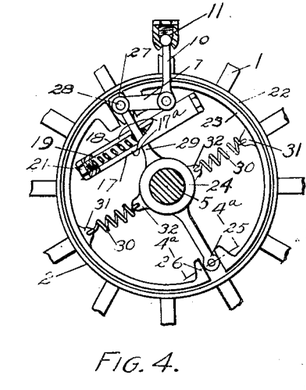
Fig. 4 a side elevation of an internal brake.
Figure 4A:
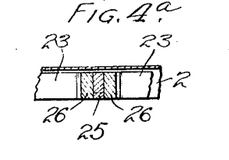
Fig. 4a is a section on the line 4a—4a in Fig. 4.

The same general functional action is accomplished in the internal brake shown in Fig. 4. Here the brake drum 22 is operated upon by the split brake shoe 23. The hub 24 is journaled on the axle and has the arm 25 extending between the shoulder ends 26 of the shoes 23. The arm 25, therefore, moves with the brake shoes. A cam 27 is mounted on a pin 28 and the pin is carried by an anchor arm 29 extending from the hub 24. The lever 7 in this case is secured to the cam 27 and the link 10 operates on the lever 7 in the same manner as in the construction shown in Figs. 1 and 2. Springs 30 extend from the ears 31 of the shoes to ears 32 of the hub 24 to release the brake shoes. The operation of this follows the operation as described in relation to Figs. 1 and 2 with the exception that the cam separates the brake shoes as the bell crank lever 7 tightened the brake band in Fig. 1.

Figure 5:
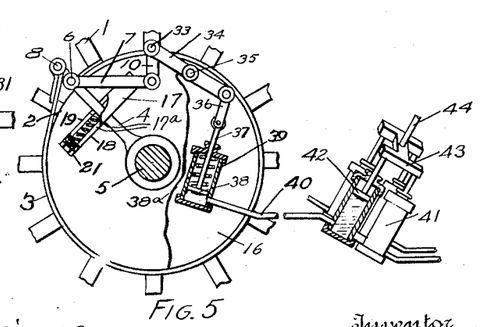
Fig. 5 a side elevation of a brake with a fluid actuating mechanism.

In the construction shown in Fig. 5 the brake band and its immediate parts are similar to those shown in Figs. 1 and 2. The lever 10 is connected by a pin 33 with a lever 34. The lever 34 is pivotally mounted on a pin 35 on the housing 16. A link 36 connects the lever 34 with a piston pin 37. The pin 37 is connected with a piston 38 arranged in a pressure cylinder 39. A spring 38a is arranged in the cylinder and tends to bring the parts back to released position. The pressure cylinder is connected by a pipe 40 with a cylinder 41. The cylinder 41 is provided with a plunger piston 42 which is connected with a head 43. The head 43 is connected by a pin 44 with an operator's brake lever.

Upon the downward movement of the plunger 42 a similar or corresponding movement is compelled in the pressure device comprising the piston 38 and its parts and the link 10 is forced inwardly setting the brake to a pressure or pull corresponding to the movement of the plunger 42.

Figures 6, 7, 8, 9, 10, 11, 12, 13:
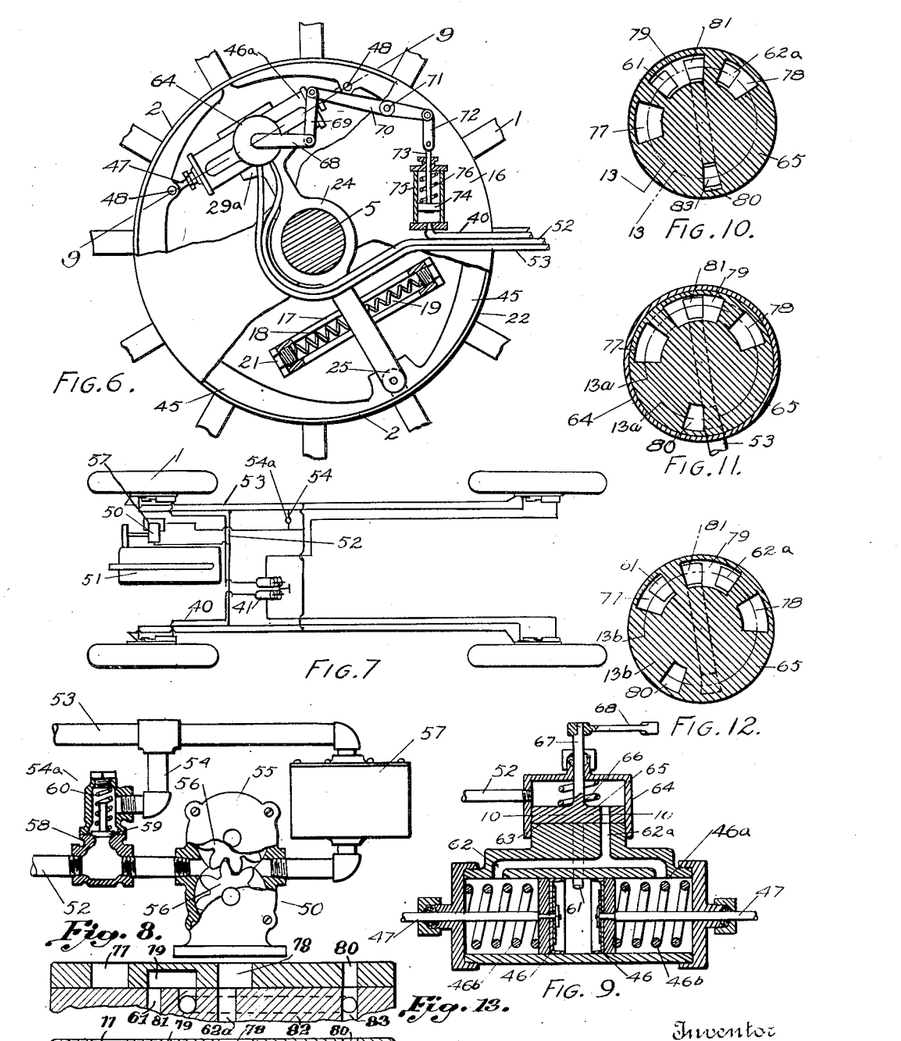
Fig. 6 a side elevation of a servo brake mechanism (fluid actuated).
Fig. 7 a diagrammatical view of a brake layout for an automobile.
Fig. 8 a view, partly in section, of the pump mechanism for supplying liquid under pressure for operating the brake shown in Fig. 6.
Fig. 9 a section of the pressure setting device and valve mechanism on the line 9—9 in Fig. 6.
Fig. 10 a section on the line 10—10 in Fig. 9 with the valve in position to release the brake.
Fig. 11 a similar section with the valve in position for the initial travel preliminary to setting the brake.
Fig. 12 a similar view with the valve in position to set the brake at its highest pressure.
Fig. 13 an annular section developed on the line 13—13 in Fig. 10.
Figures 13A, 13B:
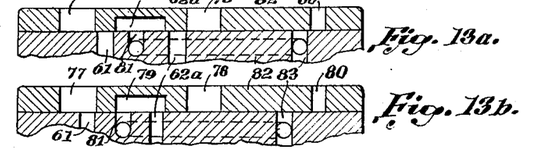
Fig. 13a an annular section developed on the line 13a—13a in Fig. 11.
Fig. 13b an annular section developed on the line 13b—13b in Fig. 12.

In the mechanical construction shown in Figs. 1, 2 and 4 exactly equal movements of the lever 7 are accomplished through the adjustment of the mechanical brake connections for each of the wheels. With the hydraulic actuating mechanism as shown in Fig. 5 this is accomplished by providing separate cylinders 41, one for each brake unit, the plungers of each cylinder being secured to the same head 43 so that they are all advanced in unison and to an equal amount. Thus each brake unit has the lever 7 set to exactly the same position and in consequence all have an equal braking effect.

Where it is desired to operate the brakes through the power of the apparatus this may be accomplished as shown in the structures of Figs. 6 to 8. This is shown in connection with the internal brake shoes 45 operating against the drum 22. A power cylinder 46a is mounted on the anchor arm 29a, the anchor arm having the hub 24 and arm 25 operating on the ends of the brake shoes as in Fig. 4. Pistons 46 are arranged in the cylinder and these are connected by the pins 47 with the brake shoes 45 through the pins 48. Springs 46b may be arranged directly in the cylinders against the pistons for holding the brake shoes in released position although when a power plant is in operation this is accomplished by fluid pressure. It will readily be seen that when the pistons are subjected to outward pressure this is communicated to the brake shoes and sets the brakes. The arm 25 in this case extends through the cylinder 17 and resists the movement of the anchor arm under the pull of the brake as in the preceding structures. Liquid under pressure is delivered to the cylinders from the pump 50 driven from an engine 51. The pump has a power circuit or flexible pipe 52 leading to the cylinders and a return flexible pipe 53 leading from the cylinders. A bypass 54 is arranged between the pressure line and return line and this is provided with a loaded valve 54a. The pump may be of any type but as shown is of the ordinary gear type having the case 55 and the meshing gears 56, these gears being driven from the engine usually from the pump shaft. The return pipe 53 leads to a small reservoir 57 which has a sufficient supply to take care of any ordinary leakage. The loaded valve is of the ordinary type having a body 58, a valve head 59, and a loading spring 60 with an adjusting screw for varying the pressure controlled by the valve. A port 61 leads from the central part of the cylinder and return ports 62 lead from the ends of the cylinder. These extend through a valve face 63 within the valve case 64. A rotary valve 65 operates over these ports and is yieldingy retained on its seat by the spring 66. A stem 67 extends from the valve. An arm 68 extends from the stem, this arm in the control corresponding somewhat to the lever 7 of the mechanical devices. The arm 68 is connected by a radially disposed link 69 with a lever 70. The lever 70 is pivoted at 71 on the housing 16. A link 72 connects the lever 70 with a pin 73 extending to a piston 74. The piston 74 is arranged in a cylinder 75 and a spring 76 returns the piston when relieved of fluid pressure. The pipe 40 leads from the cylinder 75 to a plunger cylinder 41 as shown in Fig. 5 so that with a given movement of the brake pedal the piston 74 responds with a corresponding movement moving the lever 70 and with it the lever 68 actuating the valve.

The valve is of the type ordinarily used for steering gears coming to neutral with a movement of the controlled part corresponding to the movement to which the valve is set. The valve is of an ordinary plate shape and has the three valve passages, the passage 77 extending through it which may be termed the setting passage, the passage 78 extending through it which may be termed the release passage, and the communicating passage 79 which may be termed the exhaust passage. In these respects this corresponds to an ordinary D valve, these parts operating over the port 61 leading to the center of the cylinder 46a and the port 62a communicating through the branch ports 62 with the ends of the cylinder. A bypass passage 80 extends through the valve and an exhaust port 81 communicates through a passage 82 with a bypass port 83. The bypass port 83 is connected to the return pipe 53. The valve operation can be followed from the settings in Figs. 10, 11 and 12. The release position is shown in Fig. 10. Here the bypass passage 80 is in communication with the bypass port 83 so that liquid pumped into the valve case by way of the pipe 52 is immediatly returned through the passage 80, and port 83 to the return pipe 53. The release valve passage 78 is in communication with the port 62a leading to the ends of the cylinder and the central port 61 communicates through the exhaust passage with the exhaust port 81, the setting passage 77 being over the valve seat and closed. With the initial movement of the valve it is brought to what might be termed initial operating position as shown in Fig. 11. Here the release port 62a is closed, the valve passage 77 is brought to the edge of the port 61, and the bypass passage 80 is moved out of register with the bypass port 83, thus cutting off the return flow of liquid from the valve case. Immediately the valve reaches this position the pressure of the liquid in the line is boosted to the pressure controlled by the loaded valve 54a which pressure is the desirable operating pressure on the line. A further movement of the valve in the same direction brings it to the position shown in Fig. 12 where the valve passage 77 completely uncovers the port 61 and has placed the port 62a in communication through the passage 79 with the exhaust port 81. It is obvious under these conditions that pressure is immediately delivered to the central part of the cylinder and the pistons 46 are forced outwardly setting the brake. As soon as pull is exerted on the anchor arm 29a on which the cylinder is mounted this anchor arm swings against the resistance of one or the other of the springs 18 in the housing 17. Here as in the preceding structures the swinging movement of the anchor arm and controlling lever 68 swings the link 69 and with it compelling an outward movement of the lever 68 and this continues until the valve is brought back to the neutral position indicated in Fig. 11 where the parts come to rest. It will be understood that the valve need not be moved to the extreme position shown in Fig. 12 but may, through the depression of the controlling lever on the pressure device, be moved to any intermediate position, thus setting the brake to any intermediate pull desired. The pressure on the pistons is sufficient to set the brake shoes to exert a pull much in excess of what is necessary or desirable and this is immediately released. This moving forward of the arm 29a takes place instantly and with the initial opening of the valve so that the release action follows immediately the stopping of the control movement. The pull, therefore, is one that will balance the spring 18 at the position that the valve is brought to neutral and this, as before stated, is dependent on the amount of inward movement of the lever 68. Thus it is possible to exert exactly equal braking effect on a plurality of brake units because the braking effect is not dependent upon the pressure exerted by the control devices but is dependent upon the extent of movement of those devices which compel a corresponding movement of the anchorage and consequently compel the corresponding braking effect which must accompany such movement of the anchorage.

Figures 14, 15, 16, 17:
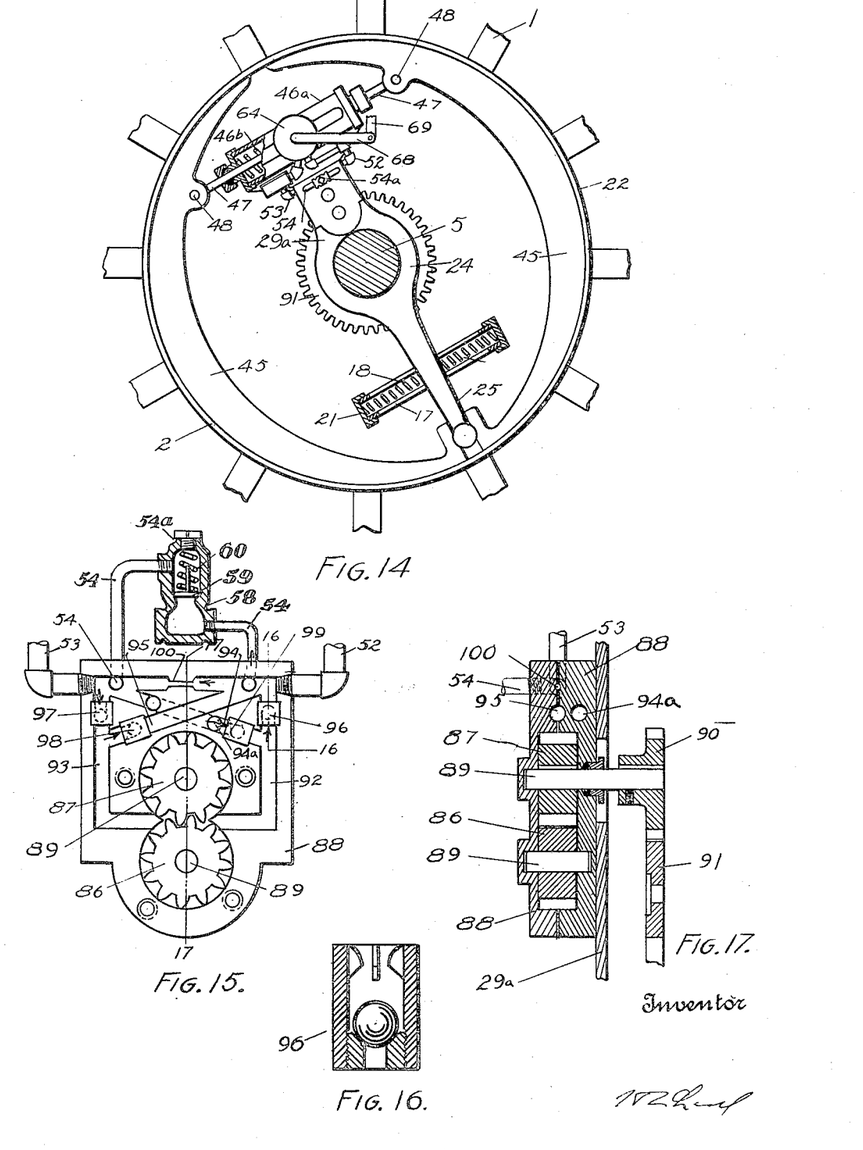
Fig. 14 a side elevation, partly in section, of a servo brake receiving its power from the wheel on which the brake acts.
Fig. 15 a view of the pump with one side of the housing removed.
Fig. 16 a section on the line 16—16 in Fig. 15.
Fig. 17 a section on the line 17—17 in Fig. 15.

As I have before stated, it is desirable to make the brake responsive to the speed of the wheel so that any tendency to skid because of the locking of the wheel may be avoided. This is accomplished with the present structure, the special features of which are shown in Figs. 14 and 15, and 16. This is supplied with the same brake mechanism as shown in Fig. 6. In this structure the pump is mounted directly on the anchor arm, there being a pump for each brake unit, that is to say, on each wheel. Any type of pump may be used but preferably the gear type as shown and is mounted directly on the anchor arm 29a. This mounting is not functionally necessary but is desirable in that it simplifies the connections between the pump and the cylinder 46a. The gear pump comprises the gears 86 and 87 arranged in a split case 88. The gears 86 and 87 are mounted on shafts 89 and one of the shafts 89 is provided with a gear 90 meshing with a gear 91 on the hub of the wheel so that the gears are constantly driven with the wheel and reversed with the wheel.

In Fig. 15 the valve scheme is shown whereby a reversal of the pump will not change the delivery of the liquid. The pipe 52 in this instance is connected with one side of the pump by a passage 92, and the pipe 53 with the opposite side of the pump by a passage 93. A cross passage 94 leads from the passage 92 to the passage 93 and a cross passage 95 leads from the passage 93 to the passage 92. A check valve 96 is in the passage 92 and prevents a return flow toward the pump in this passage, the check valve being more remote from the pump than the junction of the passage 94 with the passage 92. A similar check valve 97 is arranged in the passage 93 and prevents an outflow of liquid through this passage and this check valve is more remote from the pump than the juncture of the passage 95 with the passage 93. A check valve 98 is arranged in the cross passage 95 preventing a flow from the passage 92 to the passage 93 but permitting a return passage from the passage 93 to the passage 92. A check valve 99 in the passage 94 prevents a return flow from the passage 92 to the passage 93 but permits a flow from the passage 93 to the passage 92. The bypass 54 is arranged as in the structure shown in Fig. 8 and has the same loaded valve 54a. A fixed bypass 100 connects the passages 93 and 92 permitting under all conditions a flow through the bypass 100 very much less than the capacity of the pump at the normal speeds of the wheel. In forming the pump and passages I prefer to form this with two sections, or side plates having the passages formed therein, one of the side plates having a cored portion at 94a to provide for the crossing of the passages 94 and 95 and the valves are formed in small separate units inserted in the passage as the sections are united, the construction of valves being shown in Fig. 16.

This structure works in the same manner so far as the braking effect is concerned, as does the structure shown in Fig. 6 and is provided with the same controlling valve and pressure controlling device and it operates so far as the setting of the brakes is concerned in exactly the same manner as does the structure shown in Fig. 6. When, however, the speed of the wheel becomes very much reduced due to a lack of traction of the wheel the speed of the pump is reduced to a point where the capacity of the pump will result in movement through the fixed bypass 100 only and consequently will not create a sufficient pressure in the cylinder 46a to overcome the pressure of the springs 46b. Immediately, therefore, when this low speed is reached the brakes are released thus preventing the locking of the wheel through lack of traction. The speed at which the brake will begin to release is controlled by the relation between the capacity of the fixed bypass and the strength of the springs 46b and may be set at any desired point. As soon as the wheel begins to revolve through proper traction the brake immediately automatically again engages with the pull to which the mechanism is set through the control mechanism.

In all the different structures there is the underlying scheme involving an engagement resulting in a definite brake pull with a given setting of the braking mechanism.

In the structures shown in Figs. 1 and 2 this is accomplished with what is commonly known as an eccentric brake. The braking effort is delivered through the link 15 to the lever 12 and this acting on the link 10 actuates the lever 7 inwardly about its fulcrum pin 6 setting the brake band. The lever 7 is fulcrumed in the anchoring arm 4 so that any pull of the brake is delivered to the spring 18. As the anchor yields under the pull of the brake, the link 10 is swung pulling the lever 7 outwardly thus releasing some of the engagement of the brake band and this releasing action is continued until the arm 4 reaches a pre-determined position for a pre-determined setting of the lever—in other words, the spring 18 weights the brake pull and controls the releasing mechanism in accordance with this pull.

Practically the same scheme of mechanism is applied to an internal brake in the structure shown in Fig. 4.

In the hydraulically actuated brake, as shown in Fig. 5, the fluid pressure is accomplished through a direct effort of the operator operating on the plunger 42. This actuates the plunger 38 and swings the lever 34. The link 10 is actuated by the lever 34 and operates on the remaining mechanism of the brake in the same manner as the link 10 in Fig. 1. It will be noted that with a given setting of the plunger 42 there will be a corresponding movement of the plunger 38 and this gives a definite setting to the lever 34 and as a result a releasing position responding to an approximately definite pull through the swinging of the link 10 as the arm 4 swings under the brake pull against the spring 18.

In the construction shown in Fig. 6 and those immediately following the fluid pressure for setting the brake is supplied by a pump driven by the apparatus and all that the operator does in operating the hydraulically actuated brake is to actuate the valve for admitting the actuating liquid. The same plunger 42 is used delivering through the pipe 40 to the cylinder 75 to actuate the plunger 74. This plunger 74 operates a lever 70 which is connected by a link 69 with the control lever of the valve. The brakes are set hydraulically through fluid admitted and controlled by the valve. The valve mechanism and the cylinder controlled by it swing with the brake shoes, the swinging action being resisted as in the former structures by the spring 18. As the valve swings the link 69 is also swung and this action tends to close the valve so that when a pull has been delivered through the brake shoes sufficient to overcome the spring to a given extent the valve will be closed through the swinging action of the link and the valve lever, the amount of movement necessary to accomplish this valve closure being set, or determined initially by the setting of the lever 70 through the hydraulic setting mechanism going back to the plunger 42.

The structure illustrated in Fig. 14 and the figures immediately following is similar to the structure illustrated in Fig. 6 and the figures immediately following except that the pump which supplies the liquid for each individual wheel of the automobile is supplied from the pump 86, 87 driven by that particular wheel so that the brake action is released not only through the closing of the valve but is also released through the cessation of pumping should the wheel stop and by varying a bypass restriction the braking action is gradually released through the reduction in speed of the wheel so that in this instance there is control automatically not only through the releasing mechanism with a given brake pull but also a control action on the brake responsive to the speed of the wheel. Following the mechanism it will be noted with the gear pump acting with the gear 87 turning clockwise the liquid is delivered through the pipe 53, past the check valve 97 through the passage 93, past the pump, through the passage 92, the valve 96, to the pipe 52, the pipe 54 extending between the passages 92 and 93 and the pipe being provided with a loaded valve 58, the fixed restriction 100 permitting some bypass and a variation in pressure due to the acceleration through the restriction. With the gear 87 operating counter-clockwise the liquid enters through the pipe 93, passes through the cross passage 94, by the valve 99 to the passage 92 and thence to the pump, the check valve 96 preventing a flow to the passage 92. The liquid passes from the pump through the passage 93, the check valve 97 preventing a back flow to the pipe 53 and the check valve 98 permitting a flow through and to the cross passage 95 thence to the pipe 52, the loaded valve 58 and restriction 100 operating in the same manner as with the course of liquid heretofore described.

What I claim as new is:—

1. In a brake the combination with a rotating member and a brake member acting frictionally on the rotating member of devices comprising means setting the brake member, said devices compelling a braking effort corresponding in torque resistance to the setting of the devices.

2. In a brake, the combination with a rotating member and a brake member acting frictionally on the rotating member of devices acting on the brake member to effect a predetermined braking effort with each setting of the devices through an automatic release of the brake member with an excess of effort.

3. In a brake, the combination with a rotating member and a brake member acting frictionally on the rotating member of a yielding anchorage yielding directly in proportion to the pull of the brake member resisting a movement of the brake member with the rotating member; and devices setting the brake member said setting devices being released by the yielding of the anchorage to an extent corresponding to the setting of the brake.

4. In a brake, the combination with a rotating member and a brake member acting frictionally on the rotating member of a yielding anchorage yielding directly in proportion to the pull of the brake member resisting a movement of the brake member with the rotating member; a spring resisting the movement of the anchorage; and devices setting the brake member said setting devices being released by the yielding of the anchorage to an extent corresponding to the setting of the brake.

5. In a brake, the combination with a rotating member and a brake member acting frictionally on the rotating member of a yielding anchorage yielding directly in proportion to the pull of the brake member resisting a movement of the brake member with the rotating member; devices setting the brake member by a radial movement of the devices; and a swinging link operating in the devices effecting a release of the devices by the swinging of the link.

6. In a brake, the combination with a rotating member and a brake member acting frictionally on the rotating member of a yielding anchorage yielding directly in proportion to the pull of the brake member resisting the movement of the brake member with the rotating member; and devices setting the brake member comprising a lever movable with the anchorage and means actuating the lever released by the turning movement of the lever with the anchorage.

7. In a brake, the combination with a rotating member and a brake member acting frictionally on the rotating member of a yielding anchorage yielding directly in proportion to the pull of the brake member resisting the movement of the brake member with the rotating member; and devices setting the brake member comprising a lever movable with the anchorage and means actuating the lever released by the turning movement of the lever with the anchorage comprising a radially disposed link acting on the lever.

8. In a brake the combination with a rotating member and a brake member acting frictionally on the rotating member of fluid actuated devices setting the brake member, said devices compelling a braking effort corresponding to and varying with the setting of the devices through an automatic release of the brake member with an excess of effort.

9. In a brake, the combination with a rotating member and a brake member acting frictionally on the rotating member of devices comprising power driven means and controlling mechanism comprising means compelling a braking effort corresponding to the setting of the controlling mechanism.

10. In a brake, the combination with a rotating member and a brake member acting frictionally on the rotating member of devices comprising power driven means and controlling mechanism compelling a braking effort corresponding to the setting of the controlling mechanism through an automatic release with an excess of effort.

11. In a brake, the combination with a rotating member and a brake member acting frictionally on the rotating member of devices comprising power driven fluid actuated means and controlling mechanism comprising means compelling a braking effort corresponding to the setting of the controlling mechanism.

12. In a brake, the combination with a rotating member and a brake member acting frictionally on the rotating member of devices setting the brake member, said devices compelling a braking effort corresponding to the setting of said devices and being responsive to the pull of the brake member and the speed of the rotating member to release the brake member.

13. In a brake, the combination with a rotating member and a brake member acting frictionally on the rotating member of devices comprising power driven means and fluid actuated control mechanism comprising means compelling a braking effort corresponding to the setting of the control mechanism.

14. In a brake, the combination with a rotating member and a brake member acting frictionally on the rotating member of devices comprising power driven means and fluid actuated control mechanism compelling a braking effort corresponding to the setting of the control mechanism through an automatic release acting through the control mechanism with an excess of braking effort.

15. In a brake, the combination with a rotating member and a brake member acting frictionally on the rotating member of devices comprising power driven fluid actuated means and fluid actuated control mechanism comprising means compelling a braking effort corresponding to the setting of the control mechanism.

16. In a brake, the combination with a rotating member and a brake member acting frictionally on the rotating member of fluid actuated devices setting the brake member, said devices being responsive to the rotating member to reduce the braking action on an abnormal decrease in speed.

17. In a brake, the combination with a rotating member and a brake member acting frictionally on the rotating member of fluid actuated devices setting the brake member, said devices compelling a braking effort corresponding to the setting of said devices and being responsive to the pull of the brake member and the speed of the rotating member to release the brake member.

18. In a brake, the combination with a rotating member and a brake member acting frictionally on the rotating member of devices setting the brake comprising means driven by the rotating member and controlling mechanism comprising means compelling a braking effort corresponding to the setting of the controlling mechanism.

19. In a brake, the combination with a rotating member and a brake member acting frictionally on the rotating member of devices setting the brake comprising fluid actuated means driven by the rotating member and controlling mechanism comprising means compelling a braking effort corresponding to the setting of the controlling mechanism.

20. In a brake, the combination with a rotating member and a brake member acting frictionally on the rotating member of devices setting the brake member comprising means driven by the rotating member and controlling mechanism comprising means responsive to the speed of the rotating member to relieve the brake.

21. In a brake, the combination with a rotating member and a brake member acting frictionally on the rotating member of devices setting the brake members, said devices comprising means driven by the rotating member and controlling mechanism, acting with said devices, said devices compelling a braking effort corresponding to the setting of the controlling mechanism and responsive to the speed of the rotating member to relieve the braking action upon an abnormally slow speed of the rotating member.

22. In a brake, the combination with a rotating member and a brake member acting frictionally on the rotating member of devices setting the brake member, said devices comprising fluid actuated means driven by the rotating member and controlling mechanism, said devices compelling a braking effort corresponding to the setting of the controlling mechanism and being responsive to the pull of the brake for automatically releasing the brake and to the speed of the rotating member for relieving the brake with an abnormally low speed of the rotating member.

23. In a brake, the combination with a rotating member and a brake member acting frictionally on the rotating member of power driven fluid actuated devices setting said brake member comprising a pump, a pressure member receiving the fluid from and returning the same to the pump, and controlling means comprising a valve to obstruct the return flow of the fluid to the pump to actuate the pressure member, said means being responsive to the pull of the brake member to control the valve.

24. In a brake, the combination with a rotating member and a brake member acting frictionally on the rotating member of power driven fluid actuated devices setting the brake member comprising a pump and an actuating member, outgoing and return connections between the pump and pressure member, a bypass between said connections having a loaded valve, and controlling means comprising a valve between the bypass and the pressure member controlling the connection between the pump and the pressure member.

25. In a brake, the combination with a rotating member and a brake member acting frictionally on the rotating member of power driven fluid actuated devices setting the brake member comprising a pump and an actuating member, outgoing and return connections between the pump and pressure member, a bypass between said connections having a loaded valve, and controlling means comprising a valve controlling the connection between the pump and the pressure member and controlling devices for the valve responsive to the pull of the brake member.

26. In a brake, the combination with a rotating member and a brake member acting frictionally on the rotating member of power driven fluid actuated devices setting the brake member comprising a pump and an actuating member, outgoing and return connections between the pump and pressure member, a bypass between said connections having a loaded valve, and controlling means comprising a valve controlling the connection between the pump and the pressure member, said member having a valve bypass said valve establishing the valve bypass at release position and closing the bypass in a setting position.

27. In a brake, the combination with a rotating member and a brake member acting frictionally on the rotating member of power driven fluid actuated devices setting the brake member comprising a pump and an actuating member, outgoing and return connections between the pump and pressure member, a bypass between said connections having a loaded valve, and controlling means comprising a valve controlling the connection between the pump and pressure member, said member having a valve bypass said valve establishing the valve bypass at release position and closing the bypass in a setting position, and controlling mechanism for the valve, to said controlling mechanism being responsive to the pull of the brake member to control the valve to compel a braking effort of the brake member corresponding to the initial setting of the valve.

28. In a brake, the combination with a rotating member and a brake member acting frictionally on the rotating member of fluid actuated devices driven by the rotating member comprising a pump and an actuating member, outgoing and return connections between the pump and pressure member, a loaded valve bypass and a restricted bypass between said connections, and controlling means comprising a valve controlling the connection between the pump and the pressure member.

29. In a brake, the combination with a rotating member and a brake member acting frictionally on the rotating member of fluid actuated devices driven by the rotating member comprising a pump and an actuating member, outgoing and return connections between the pump and pressure member, a loaded valve bypass and a restricted bypass between said connections, and controlling means comprising a valve controlling the connection between the pump and the pressure member and controlling devices for the pump responsive to the pull of the brake member.

30. In a brake, the combination with a rotating member and a brake member acting frictionally on the rotating member of devices comprising means setting the brake member, said devices compelling a braking effort corresponding to the setting of the devices with the rotating member operating in either direction.

31. In a brake, the combination with a rotating member and a brake member acting frictionally on the rotating member of devices setting the brake member, said devices comprising means responsive to the pull of the brake member corresponding to the setting of the devices to release the brake member with the rotating member operating in either direction.

32. In a brake, the combination with a rotating member and a brake member acting frictionally on the rotating member of a yielding anchorage yielding in proportion to the torque on the anchorage for the brake member resisting a movement of the brake member with the rotating member; and devices setting the brake member comprising means released by the yielding of the anchorage with the rotating member operating in either direction.

33. In a brake, the combination with a rotating member and a brake member acting frictionally on the rotating member of a yielding anchorage yielding in proportion to the torque on the anchorage for the brake member resisting a movement of the brake member with the rotating member; devices setting the brake member by a radial movement of the devices; and a swinging link operating on the devices affecting a release of the devices by the swinging of the link with the rotating member operating in either direction.

34. In a brake, the combination with a rotating member and a brake member acting frictionally on the rotating member of a yielding anchorage yielding in proportion to the torque on the anchorage for the brake member resisting the movement of the brake member with the rotating member; and devices setting the brake member comprising a lever movable with the anchorage and means actuating the lever released by the turning movement of the lever with the anchorage with the rotating member operating in either direction.

35. In a brake, the combination with a rotating member and a brake member acting frictionally on the rotating member of devices comprising power driven means and controlling mechanism comprising means compelling a braking effort corresponding to the setting of the controlling mechanism with the rotating member operating in either direction.

36. In a brake, the combination with a rotating member and a brake member acting frictionally on the rotating member of devices setting the brake member, said devices being responsive to the rotating member to reduce the braking action on an abnormal decrease in speed with the rotating member operating in either direction.

37. In a brake, the combination with a rotating member and a brake member acting frictionally on the rotating member of devices setting the brake member, said devices compelling a braking effort corresponding to the setting of said devices and being responsive to the pull of the brake member and the speed of the rotating member to release the brake member with the rotating member operating in either direction.

38. In a brake, the combination with a rotating member and a brake member acting frictionally on the rotating member of fluid actuated devices setting the brake member, said devices compelling a braking effort corresponding to the setting of said devices and being responsive to the pull of the brake member and the speed of the rotating member to release the brake member with the rotating member operating in either direction.

39. In a brake, the combination with a rotating member and a brake member acting frictionally on the rotating member of devices setting the brake comprising means driven by the rotating member and controlling mechanism comprising means compelling a braking effort corresponding to the setting of the controlling mechanism with the rotating member operating in either direction.

40. In a brake, the combination with a rotating member and a brake member acting frictionally on the rotating member of devices setting the brake comprising fluid actuated means driven by the rotating member and controlling mechanism comprising devices compelling a braking effort corresponding to the setting of the controlling mechanism with the rotating member operating in either direction.

41. In a brake, the combination with a rotating member and a brake member acting frictionally on the rotating member of devices setting the brake member, said devices comprising fluid actuated means driven by the rotating member and controlling mechanism, said devices compelling a braking effort corresponding to the setting of the controlling mechanism and being responsive to the pull of the brake for automatically releasing the brake and to the speed of the rotating member for relieving the brake with an abnormally low speed of the rotating member with the rotating member operating in either direction.

42. A brake system having a plurality of braking units each comprising the combination with a rotating member and a brake member acting frictionally on the rotating member of devices comprising means setting the brake member, said devices compelling a braking effort corresponding to the setting of the devices.

43. A brake system having a plurality of braking units each comprising the combination with a rotating member and a brake member acting frictionally on the rotating member of devices comprising means setting the brake member, said device compelling a braking effort corresponding to the setting of the devices, and means for actuating said devices equally.

44. A brake system having a plurality of braking units each comprising the combination with a rotating member and a brake member acting frictionally on the rotating member of a yielding anchorage yielding in proportion to the torque on the brake member for the brake member resisting a movement of the brake member with the rotating member; devices setting the brake member released by the yielding of the anchorage; and means for actuating said devices equally.

45. A brake system having a plurality of braking units each comprising the combination with a rotating member and a brake member acting frictionally on the rotating member of devices comprising means setting the brake member, said devices compelling a braking effort corresponding to the setting of the devices comprising a fluid actuated pressure member on each unit and a group of fluid pressure exerting mechanisms, each of the group being connected with one of the pressure members; and means for actuating said mechanisms in unison.

46. A brake system having a plurality of braking units each comprising the combination with a rotating member and a brake member acting frictionally on the rotating member of devices comprising power driven means and fluid actuated control mechanism comprising means compelling a braking effort corresponding to the setting of the control mechanism, said control mechanism comprising a fluid actuated pressure member for each unit and a group of fluid pressure exerting mechanisms, each of the group being connected with one of the pressure members; and means for actuating said pressure exerting mechanisms in unison.

47. A brake system having a plurality of braking units each comprising the combination with a rotating member and a brake member acting frictionally on the rotating member of devices comprising power driven means and controlling mechanism comprising means compelling a braking effort corresponding to the setting of the controlling mechanism; and means for actuating said devices equally.

48. A brake system having a plurality of braking units each comprising the combination with a rotating member and a brake member acting frictionally on the rotating member of devices comprising means driven by the rotating member and controlling mechanism comprising means compelling a braking effort corresponding to the setting of the controlling mechanism; and means for actuating said devices equally.

49. The method of actuating brakes which consists in subjecting the brake to a control directly responsive to the pull of the brake, determined at the will of the operator with the setting of the brake.

50. The method of actuating brakes which consists in subjecting the brake to a control directly responsive to the pull of the brake in either direction determined at the will of the operator with the setting of the brake.

51. The method of actuating brakes which consists in subjecting the brake to a control responsive to the pull of the brake and the speed of the member subjected to the braking action, determined at the will of the operator with the setting of the brake.

52. The method of actuating brakes which consists in subjecting the brake to a control responsive to the pull of the brake and the speed of the member subjected to the braking action in either direction, determined at the will of the operator with the setting of the brake.

53. The method of actuating brakes which consists in subjecting the brake to a control responsive to the speed in either direction of the member subjected to the braking action.

In testimony whereof I have hereunto set my hand.

HUGH C. LORD.